United States Patent [19]
Bernard et al.

[11] Patent Number: 5,688,902
[45] Date of Patent: Nov. 18, 1997

[54] PROCESS FOR THE PREPARATION OF POLYIMIDES OR OF THEIR BIODEGRADABLE POLYPEPTIDE HYDROLYSATES

[75] Inventors: Jean-Marie Bernard, Mornant; Jean-Luc LePage, Francheville; Arnaud Ponce, Aubervilliers; Florence Tournilhac, Paris, all of France

[73] Assignee: Rhone-Poulenc Chimie, Courbevoie, France

[21] Appl. No.: 672,163

[22] Filed: Jun. 27, 1996

Related U.S. Application Data

[63] Continuation of Ser. No. 342,943, Nov. 21, 1994, abandoned.

[30] Foreign Application Priority Data

Nov. 24, 1993 [FR] France .................. 93 14042
Nov. 24, 1993 [FR] France .................. 93 14043

[51] Int. Cl.$^6$ .......... C08G 69/08; C08G 73/10; C08K 3/32
[52] U.S. Cl. .......... 528/313; 528/312; 528/313; 528/314; 528/315; 528/318; 528/322; 528/499; 524/706; 524/730; 524/742; 524/745; 252/89.1
[58] Field of Search .................. 528/312, 313, 528/314, 315, 318, 322, 499; 524/706, 730, 742, 745; 252/89.1

[56] References Cited

U.S. PATENT DOCUMENTS

| | | | |
|---|---|---|---|
| 3,052,655 | 9/1962 | Fox et al. | 260/78 |
| 3,927,204 | 12/1975 | Neri et al. | 424/78 |
| 4,675,381 | 6/1987 | Bichon | 530/345 |
| 4,892,733 | 1/1990 | Bichon | 424/422 |
| 5,457,176 | 10/1995 | Adler et al. | 528/328 |

FOREIGN PATENT DOCUMENTS

| | | |
|---|---|---|
| 2059475 | 7/1970 | France . |
| 0130935A1 | 4/1984 | France . |
| WO87/03891 | 7/1987 | France . |
| 0454126A1 | 4/1991 | France . |
| 0511037A1 | 3/1992 | France . |
| 2461350 | 12/1971 | Germany . |
| 2246786 | 2/1992 | United Kingdom . |

OTHER PUBLICATIONS

Journal of Medicinal Chemistry (Neri et al.), vol. 18, No. 8, pp. 893–897, Aug. 1973.
French Preliminary Search Report #FR9314043.
French Preliminary Search Report #FR9314042.

*Primary Examiner*—Samuel A. Acquah
*Attorney, Agent, or Firm*—John Daniel Wood

[57] ABSTRACT

Process for the preparation of polyimides or of their polypeptide hydrolysates which are at least 80% biodegradable, by thermal polycondensation of at least one amino acid, optionally followed by hydrolysis, the thermal polycondensation step being carried out in the presence of at least one "acid catalyst" chosen from sulphuric, nitric, phosphorous, sulphurous, hydrofluoric, silicic and sulphonic acids, organic sulphonic acids containing less than 50 carbon atoms, amino acids bearing a non-carboxyl strong acid function, organic phosphonic acids, organic carboxylic acids having a $pK_a$ lower than or equal to 5, preferably lower than or equal to 3;

precursors of these acids;

salts of these acids and of an amino acid which is similar to or different from that or those used;

salts of these acids and of a polyimide derived from the polycondensation of at least one amino acid which is similar to or different from that or those used;

hydrochloric acid and its precursors salts of hydrochloric acid and of an amino acid which is similar to or different from that or those used, when the amino acid to be polycondensed is other than glutamic acid;

salts of hydrochloric acid and of a polyimide derived from the polycondensation of at least one amino acid which is similar to or different from that or those used;

acid salts of sulphuric, phosphoric or phosphorous acids or their precursors;

phosphoric acid precursors other than phosphoric anhydride or polyphosphoric acids;

and Lewis acids;

according to an "acid catalyst"/amino acid molar ratio of at least 0.001.

Use of the polyimides or of the polypeptide hydrolysates thus obtained in detergent compositions, and detergent compositions containing the said polyimides or hydrolysates.

20 Claims, No Drawings

PROCESS FOR THE PREPARATION OF POLYIMIDES OR OF THEIR BIODEGRADABLE POLYPEPTIDE HYDROLYSATES

This application is a continuation of application Ser. No. 08/342,943 filed Nov. 21, 1994, which application is now abandoned.

The subject of the present invention is a process for the preparation of polyamides, in particular polysuccinimides, or of their polypeptide hydrolysates which are naturally at least 80% biodegradable. It also concerns the use of the polyamides or of the polypeptide hydrolysates thus obtained in detergent compositions, as well as detergent compositions containing the said polyamides or their hydrolysates as "builder" or "cobuilder" agents.

It is known to obtain polyimides by thermal polycondensation of amino acids, especially aspartic acid, for which the polypeptide hydrolysates have a biodegradability in natural medium of the order of 75% (EP-A-511037).

The Applicant has now found a process making it possible to obtain polyimides, especially polyimides derived from aspartic acid, for which the polypeptide hydrolysates are at least 80% and preferably at least 85% biodegradable.

According to the invention it is a process for the preparation of polyimides or of their polypeptide hydrolysates of at least 80%, preferably of at least 85%, biodegradability, by thermal polycondensation of at least one amino acid, optionally followed by hydrolysis, the said process being characterized in that the thermal polycondensation step is carried out in the presence of at least one "acid catalyst" chosen from

- sulphuric, nitric, phosphorous, sulphurous, hydrofluoric, silicic and sulphonic acids, organic sulphonic acids containing less than 50 carbon atoms, preferably less than 25 carbon atoms, amino acids bearing a non-carboxyl strong acid function, organic phosphonic acids, organic carboxylic acids having a $pK_a$ lower than or equal to 5, preferably lower than or equal to 3;
- precursors of these acids;
- salts of these acids and of an amino acid which is similar to or different from that or those used;
- salts of these acids and of a polyimide derived from the polycondensation of at least one amino acid which is similar to or different from that or those used;
- hydrochloric acid and its precursors
- salts of hydrochloric acid and of an amino acid which is similar to or different from that or those used, when the amino acid to be polycondensed is other than glutamic acid;
- salts of hydrochloric acid and of a polyimide derived from the polycondensation of at least one amino acid which is similar to or different from that or those used;
- acid salts of sulphuric, phosphoric or phosphorous acids or their precursors;
- phosphoric acid precursors other then phosphoric anhydride or polyphosphoric acids;
- and Lewis acids;

according to an "acid catalyst"/amino acid molar ratio of at least 0.001, preferably of the order of 0.005 to 10 and very particularly of the order of 0.01 to 5.

Acid or acid salt precursor is understood to refer to any product which liberates at least one of the abovementioned acids or acid salts under polycondensation operating conditions; this liberation may be obtained by virtue of the temperature or by the action of the water formed in situ.

In the definition of the mole of "acid catalyst", elemental entity will be taken as referring to protons in the case of acids, acid salts or their precursors; in the case of a salt of an amino acid or a polyimide, the elemental entity considered will be the $NH^{3+}$ function; in the case of Lewis acids the elemental entity considered will be the molecule.

In the definition of the mole of amino acid, elemental entity will be taken as referring to the molecule.

"Acids" will be understood hereinafter to refer to acids, acid or acid salt precursors, Lewis acids and acid salts which are not derived from amino acids mentioned above as catalysts; "amino acid salts" or "aspartic acid salts" will be understood to refer to the salts derived from inorganic or organic acids and from amino acids or from aspartic acid; "polyimide salts" will be understood to refer to the salts derived from inorganic or organic acids and from a polyimide derived from the amino acid polycondensation.

Among the amino acids which my be used in order to carry out the process of the invention, there may be mentioned aspartic acid or glutmmic acid, taken alone or mixed together in any particular proportions or mixed with another amino acid (for example up to 15% by weight, preferably less than 5% by weight, of glycine, alanine, valine, leucine, isoleucine, phenylalanine, methionine, histidine, proline, lysine, serine, threonine, cysteine, etc.).

Aspartic acid is the preferred amino acid. When an "amino acid salt" is used, this is preferably an "aspartic acid salt".

Among the "acid catalysts" which may be used, there may be mentioned

- sulphonic acids such as methanesulphonic, benzenesulphonic, trifluoromethanesulphonic, dodecylbenzenesulphonic, para-toluenesulphonic, cysteic acid (amino acid bearing a sulphonic function), etc.
- anhydrous or hydrated sulphuric acid, oleum, acid sulphates of potassium, lithium, sodium or quaternary ammonium, $SO_3$, etc.
- ammonium sulphate
- neutral alkali metal sulphate/sulphuric acid or neutral alkali metal or alkaline-earth metal sulphate/phosphoric or pyrophosphoric acid mixtures, according to an acid/neutral salt molar ratio of the order of 0.5/1 to 10/1, preferably of the order of 1/1 to 3/1
- hydrogen phosphates of potassium, sodium, lithium or quaternary ammonium, etc.
- HCl, $PCl_3$, $PCl_5$, $POCl_3$, cyanuric chloride
- halosilanes such as $SiCl_4$, $CH_3SiCl_3$, etc.
- salicylic acid, chloroacetic acids, etc.
- phosphonic acids such as phosphomethylglycine, ethylphosphonic acid, etc.
- aspartic acid hydrochloride (when the amino acid to be polycondensed is other than glutamic acid), salts of aspartic acid and of sulphuric, methanesulphonic, para-toluenesulphonic etc. acid
- polysuccinimide hydrochloride (polyhydroaspartic acid hydrochloride), etc.
- $AlCl_3$, $BF_3$, $ZnCl_2$.

The thermal polycondensation operation my be carried out at a temperature of the order of 100° to 250° C., preferably at a temperature of the order of 150° to 220° C. The said operation my be carried out at a chosen temperature, or one which follows a pre-established temperature profile.

This thermal polycondensation operation my be carried out in bulk or in a solvent medium, at atmospheric pressure, under pressure (preferably up to 20 bars) or under vacuum (preferably greater than 1 mbar).

A bulk operation may thus be carried out, for example:

from the amino acid to which is added the "acid", the "amino acid salt" or the "polyimide salt"; the "acid", the "amino acid salt" or the "polyimide salt" may be introduced under hot or cold conditions, at atmospheric pressure or under pressure, and in the solid or liquid state;

from the amino acid with throughput of the "acid" in the gaseous form, optionally diluted in an inert gas, if the said "acid catalyst" is sufficiently volatile at the polycondensation temperature.

The thermal polycondensation operation may also be carried out in a solvent medium, for example:

from the amino acid suspended in a solvent, to which is added the "acid", the "amino acid salt" or the "polyimide salt"; the "acid", the "amino acid salt" or the "polyimide salt" may be introduced under hot or cold conditions, at atmospheric pressure or under pressure, and in the solid, liquid or gaseous form (optionally diluted in an inert gas);

from the "acid", the "amino acid salt" or the "polyimide salt" suspended or dissolved in a solvent, to which is added the amino acid.

Among the solvents which my be used, there may be mentioned those which are inert towards the "acid catalyst" and for which the boiling point is greater than or equal to the reaction temperature, such as dibutyl phthalate, diphenyl ether, decalin, tetralin, ortho-cresol, etc.

A production variant of the thermal polycondensation operation in bulk or in a solvent medium consists in using an "amino acid salt" as the sole constituent of the reaction in place of an amino acid/"acid catalyst" mixture; the said "amino acid salt" is thus present in bulk or suspended in a solvent.

It is very particularly advantageous to carry out the polycondensation operation in bulk with a reaction medium which remains in the pulverulent or friable form throughout the whole of the said operation. The polycondensation operation may then be carried out industrially using a simple apparatus, and without solidification of the medium, in the presence of a relatively low amount of solid or liquid "acid catalyst". A means of avoiding obtaining low levels of conversion of the amino acid, due to the limited level of "acid catalyst" used, consists in distributing the catalyst homogeneously in the pulverulent medium which is subjected to the polycondensation operation. The amount of catalyst which may be used depends on the nature of the said catalyst. Thus, when the "acid catalyst" consists of an acid salt or of an acid salt precursor, an "acid catalyst"/amino acid molar ratio of the order of 0.001 to 0.15, preferably of the order of 0.005 to 0.15, is well suited; when the "acid catalyst" is other than an acid salt or an acid salt precursor, an "acid catalyst"/amino acid molar ratio of the order of 0.001 to 0.05, preferably of the order of 0.005 to 0.05, is suitable.

There may be mentioned, among possible implementational modes which make it possible to distribute the catalyst in the pulverulent medium, the following:

forming a paste of a mixture of amino acid and of solid or liquid "acid catalyst" with water (or any other volatile liquid diluant), removing the water (or the diluent) by evaporation under vacuum or at atmospheric pressure and then grinding the mass obtained;

dissolving the amino acid and solid or liquid "acid catalyst" in water (or in any other dissolver of the amino acid and of the catalyst), preferably while hot, and then atomizing the solution;

atomizing a suspension of amino acid in a solution of solid or liquid "acid catalyst" in water (or in any other dissolver of the catalyst);

evaporating a solution of solid or liquid "acid catalyst" in water (or in any other dissolver of the catalyst) on a fluidized bed of amino acid;

cogrinding or micronizing a mixture of amino acid and of solid "acid catalyst";

preparation of aspartic acid especially, by reaction of an organic or inorganic acid and of ammonium aspartate, with incorporation, by crystallization, of the solid "acid catalyst" during the operation of precipitation of the aspartic acid.

The polyimide obtained according to the process of the invention may, if necessary, be separated, filtered, purified and dried.

Depending on the nature of the "acid catalyst" and of the medium, the catalyst may, if necessary, be separated from the polyimide by washing with water or with the aid of a solvent for the said "acid catalyst" which is not a solvent for the polyimide.

The polyimide may be purified by dissolution with the aid of a polar aprotic solvent (dimethylformamide, formamide, dimethyl sulphoxide, etc.) followed by reprecipitation with the aid of a compound which is not a solvent for the said polyimide (water, ether, ethanol, acetone, etc.).

The polyimide obtained, which is separated out or otherwise, may subsequently be hydrolysed, preferably by addition of a basic agent (alkali metal base, alkaline-earth metal base, alkali metal carbonate or alkaline-earth metal carbonate, etc.) if necessary in the presence of water, and in a homogeneous or two-phase medium; in the case of the polysuccinimide derived from aspartic acid, the hydrolysate thus obtained consists of polyaspartate (of sodium for example).

The acid form of the hydrolysate may, for example, be obtained by neutralization of the salt obtained above by alkaline hydrolysis, with the aid of an organic or inorganic acid (in particular HCl); in the case of the polysuccinimide derived from aspartic acid, the hydrolysate thus obtained consists of polyaspartic acid.

"Hydrolysate" is understood according to the invention to refer to the product obtained by partial or total hydrolysis (by the action of water) of the polyimide formed; this hydrolysis leads, via opening of the imide rings, to the formation, on the one hand, of amide functions and, on the other hand, of carboxylic acid functions (polypeptidic acids) or carboxylic acid salts (polypeptidic salts).

The polyimides or their polypeptide hydrolysates prepared according to the process of the invention may be used in particular in the field of detergents.

The subject of the present invention is thus also a detergent composition containing a polyimide such as obtained according to the abovedescribed process, which polyimide is capable of generating by hydrolysis in the detergent medium a polypeptide "builder" which is at least 80%, preferably at least 85%, biodegradable, or a hydrolysate of the said polyimide, which hydrolysate takes the form of a polypeptidic acid or salt which is at least 80%, preferably at least 85%, biodegradable.

"Builder" is understood to refer to any constituent which improves the performance of the surface agents of a detergent composition. A "builder" generally possesses a multitude of functions:

in a detergent medium it ensures that undesirable ions are removed, especially alkaline-earth metal ions (calcium and magnesium), by sequestration, complexation or precipitation in order to prevent the precipitation of the anionic surfactants, it provides a reserve of alkalinity and of ionic strength, it maintains the extracted dirt in suspension, it prevents the washing from being encrusted with minerals.

Detergent compositions containing a polyimide obtained in particular by polycondensation of aspartic acid, which is capable of generating a polypeptide "builder" by hydrolysis in the detergent medium, or containing a polypeptide poly (amino acid) "builder", are already known (EP-A-511 037 and EP-A-454 126). It has been observed that the polysuccinimide hydrolysates obtained by polycondensation of aspartic acid, used in these compositions, have a biodegradability in natural medium which generally does not exceed 75% (EP-A-511 037).

The detergent compositions according to the invention have excellent primary and secondary detergent properties.

Detergent composition according to the invention denotes laundry washing products, dishwasher cleaning products or any other washing product for domestic use.

"Detergent bath" or "detergent medium" is understood to refer to the aqueous solution of the washing product (detergent composition) present in the washing machine in the course of the washing cycles; the amount of washing product present is that recommended by the manufacturer; this is generally less than 20 g/liter; the pH of such a solution is greater than 9.

The invention relates to a detergent composition containing a polyimide which has a charge density $COO^-$ which my range from 0 to $5 \times 10^{-4}$ mol/g of polymer and which is capable of acquiring in the detergent bath a charge density $COO^-$ at least equal to $10^{-3}$ mol/g of polymer or a hydrolysate of the said polyimide, which polyimide is derived from the thermal polycondensation of at least one amino acid, optionally followed by hydrolysis, the said composition being characterized in that the said polyimide is obtained by thermal polycondensation of at least one amino acid carried out in the presence of at least one "acid catalyst" chosen from sulphuric, nitric, phosphorous, sulphurous, hydrofluoric, silicic and sulphonic acids, organic sulphonic acids containing less than 50 carbon atoms, preferably less than 25 carbon atoms, amino acids bearing a non-carboxyl strong acid function, organic phosphonic acids, organic carboxylic acids having a $pK_a$ lower than or equal to 5, preferably lower than or equal to 3;

precursors of these acids;

salts of these acids and of an amino acid which is similar to or different from that or those used;

salts of these acids and of a polyimide derived from the polycondensation of at least one amino acid which is similar to or different from that or those used;

hydrochloric acid and its precursors salts of hydrochloric acid and of an amino acid which is similar to or different from that or those used, when the amino acid to be polycondensed is other than glutamic acid;

salts of hydrochloric acid and of a polyimide derived from the polycondensation of at least one amino acid which is similar to or different from that or those used;

acid salts of sulphuric, phosphoric or phosphorous acids or their precursors;

phosphoric acid precursors other than phosphoric anhydride or polyphosphoric acids;

and Lewis acids;

according to an "acid catalyst"/amino acid molar ratio of at least 0.001, preferably of the order of 0.005 to 10 and very particularly of the order of 0.01 to 5.

The nature of the amino acids, of the examples of "acid catalysts" and the operating conditions of the polycondensation operation which may be used have already been mentioned hereinabove.

The polyimides or their hydrolysates entering into the composition of the invention may have a weight-average molecular mass of the order of 2000 to $10^7$ and generally of the order of 3500 to 60000.

The amount of polyimide or hydrolysate of the said polyimide entering into the detergent composition which forms the subject of the invention may range from 0.2 to 80%, preferably from 2 to 10%, by weight of the said detergent composition.

In addition to this polyimide or polyimide hydrolysate, at least one surface-active agent is present in the detergent composition in an amount which may range from 2 to 50%, preferably from 6 to 30%, by weight of the said detergent composition.

Among the surface-active agents entering into the detergent composition which forms the subject of the invention, there may be mentioned:

anionic surface-active agents of the soap type and alkali metal type (alkali metal salts of $C_8-C_{24}$ fatty acids), alkali metal sulphonate type ($C_8-C_{13}$ alkylbenzenesulphonates, $C_{12}-C_{16}$ alkylsulphonates, sulphated $C_6-C_{16}$ fatty alcohols, sulphated $C_8-C_{13}$ alkylphenols), alkali metal sulphosuccinate type ($C_{12}-C_{16}$alkyl sulphosuccinates), etc.

nonionic surface-active agents of the polyoxyethylenated $C_6-C_{12}$ alkylphenol, oxyethylenated $C_8-C_{22}$ aliphatic alcohol, ethylene oxide/propylene Oxide block copolymer or optionally polyoxyethylenated carboxylic amide type, etc.

Amphoteric surface-active agents of the alkyldimethylbetaine type, etc.

Cationic surface-active agents of the alkyltrimethylammonium or alkyldimethylammonium bromide or chloride type, etc.

Various constituents may in addition be present in the detergent composition of the invention in order to obtain washing products or cleaning products in powder form.

Thus, there may in addition be present in the detergent composition described above:

"builders" of the type:

phosphates in an amount of less than 25% of the total formulation weight, zeolites up to approximately 40% of the total formulation weight, sodium carbonate up to approximately 80% of the total formulation weight, silicates or cogranulates of sodium silicate and sodium carbonate up to approximately 40% of the total formulation weight, nitriloacetic acid up to approximately 10% of the total formulation weight, citric acid or tartaric acid up to approximately 20% of the total formulation weight, the total mount of "builder" corresponding to approximately 0.2 to 80%, preferably from 20 to 45%, of the total weight of the said detergent composition, bleaching agents of the perborate, chloroisocyanate or N,N, N',N'-tetraacetylethylenediamine (TAED) take up to approximately 30% of the total weight of the said detergent composition, anti-redeposition agents of the carboxymethyl cellulose or methyl cellulose type, or of the polyethylene terephthalate/polyoxyethylene terephthalate copolymer type having a polyethylene terephthalate/polyoxyethylene terephthalate molar ratio of 25/75 to 90/10, preferably from 50/50 to 90/10, derived from polyethylene glycol having a molar mass of the order of 600 to 5000, in amounts which may range up to approximately 5% of the total weight of the said detergent composition, anti-encrustation agents of the acrylic acid and maleic anhydride copolymer type in an amount which may range up to approximately 10% of the total weight of the said detergent composition, fillers of the sodium sulphate type in an amount which my range up to 50% of the total weight of the said detergent composition.

The detergent composition which forms the subject of the invention is effective either as a primary detergent or as a secondary detergent.

In addition, incorporation of the polyimide thus prepared or its hydrolysate guarantees that the detergent composition claimed has total (at least 80%, preferably at least 85%) and easy biodegradability when this compound leaves the washing machine, and when discharged into a natural environment.

The examples which follow are given as a guide and cannot be considered as limiting the scope and spirit of the invention.

The viscosity index (VI) given in these examples is measured using a SCHOTT AVS 350 capillary viscosimeter from an amount of polysuccinimide (PSI) dissolved in 0.5N sodium hydroxide so as to give a concentration of 0.002 g/ml at a temperature of 25° C.

In these examples the biodegradability of the hydrolysates is measured according to AFNOR standard T90-312 (in accordance with ISO international standard 7827 of Oct. 15, 1984).

The test is carried out using:

an inoculum obtained by filtration of the inlet water of the municipal plant at Saint Gemin au Mont d'Or (Rhône), as it is or after adaptation a test medium containing $4 \times 10^5$ bacteria/ml an amount of product to be tested such that the test medium contains an organic carbon concentration of the order of 40 ml/g.

The biodegradation rate is measured as a function of the time under the conditions of discharge into river water.

For this measurement the samples tested were obtained by hydrolysis by a dilute sodium hydroxide solution of the polysuccinimides prepared, until a sodium polyaspartate solution at a concentration of approximately 6% and of pH of the order of 9 to 11 is obtained.

The level of biodegradability is characterized by the following two parameters:

the maximum rate of biodegradation (MRB)

the time needed to pass from a biodegradation rate of 10% to a rate of 90% of the maximum rate of biodegradation (t 10–90).

Measurement of the coloration according to the HUNTER Lab method

The coloration of the polysuccinimide powders or of their hydrolysates is determined by measurement on an ACS SPECTRO-SENSOR II® spectrocolorimeter.

Measurement conditions:

illuminant: D 65 observation angle: 2°

The 3 values measured are

L: Luminance which varies between 0 (black) and 100 (white)

a: Coloration red (a positive)/green (a negative)

b: Coloration yellow (b positive)/blue (b negative)

These values are calculated from the measurements according to the formulae $L = 100 \, (Y/Yo)^{1/2}$   $a = Ka(X/Xo - Y/Yo)/(Y/Yo)^{1/2}$ $b = Kb(Y/Yo - Z/Zo)/(Y/Yo)^{1/2}$ X, Y, Z: tristimulus values corresponding to the 3 primary colours obtained with the sample; Xo, Yo, Zo: tristimulus values for the perfect diffuser of the source used; Ka, Kb: coefficients of the source used.

Preparation of the acid salts of aspartic acid

The acid salts of aspartic acid used in the examples which follow are prepared from the following starting materials

| AA | Acid | | Solvent | |
|---|---|---|---|---|
| mol | nature | mol | nature | ml |
| 0.225 | 95% $H_2SO_4$ | 0.52 | EtOAc | 100 |
| 0.225 | $CH_3SO_3H$ | 0.23 | $H_2O$ | 100 |
| 0.225 | 96% PTSA.$H_2O$ | 0.225 | $H_2O$ | 100 |
| 0.3765 | 4 N HCl | 89 ml | — | — |

The above abbreviations have the following meaning AA: L-aspartic acid (Chemie Linz) PTSA: para-toluenesulphonic acid The aspartic acid sulphate (insoluble in ethyl acetate) obtained is separated off by filtration, followed by drying under vacuum. The aspartic acid sulphonates (water-soluble) obtained are separated off by evaporation under vacuum, followed by drying under vacuum. The aspartic acid hydrochloride obtained is separated off by freeze-drying.

EXAMPLE 1

Into a 100-ml rotary evaporator flask are introduced 5 g of L-aspartic acid from Chemie Linz (equivalent to $3.76 \times 10^{-2}$ mol)

0.360 g of methanesulphonic acid (equivalent to $3.76 \times 10^{-3}$ mol)

25 ml of dibutyl phthalate

The reactants are heated to 180° C. (temperature of the oil bath) under water-pump vacuum, according to the following temperature profile:

temperature rise from 25° C. to 180° C. over 45 min temperature maintained for 1 h 20 min at 180° C. (at 12000 Pa).

The suspension obtained is filtered; the product is ground and first washed with ether, and then with the aid of 5×100 ml of water.

A cream-coloured powder is obtained which is dried under vacuum over $P_2O_5$.

2.26 g of PSI is recovered (equivalent to a yield of 62%).

The product has a viscosity index equal to 7.81 ml/g.

This polysuccinimide is hydrolysed as indicated above; the biodegradability of the hydrolysate is the following:

MRB: 98% t 10–90: 13 days

EXAMPLE 2

20.32 g of L-aspartic acid hydrochloride are introduced into a 250-ml rotary evaporator flask. The reactor is placed under inert atmosphere using nitrogen and then gradually heated from room temperature to the temperature of 240° C., according to the following temperature profile (temperature of the oil bath):

1.5° C./minute from 20° C. to 150° C.
temperature maintained for 1 hour at 150° C.
then 2° C./minute up to 240° C.
finally, temperature maintained for 30 minutes at 240° C.

The reaction mass is allowed to cool to room temperature.

11.92 g of PSI are obtained.

The product has a viscosity index equal to 10.50 ml/g and a HUNTER coloration

L=85.6
a=1.46
b=19.67

This polysuccinimide is hydrolysed as indicated above; the biodegradability of the hydrolysate is the following:

MRB: 91%
t 10–90: 8 days

EXAMPLES 3–18

Into an unsealed SCHOTT® tube (screw reactor) are introduced 5 g of L-aspartic acid (Chemie Linz)
0.5 g of "acid catalyst" featured in Table 1

The reactants are heated to 200° C. according to the following temperature profile:
temperature rise from 25° C. to 200° C. over 20 min
temperature maintained for 4 h at 200° C.

The product is poured into 1 liter of water, filtered off and then dried under vacuum in a desiccator at 40° C.

EXAMPLES 19–28

The operation described in Examples 3–18 is repeated, varying the amounts of "acid catalyst" and the duration of the fixed temperature period according to the characteristics given in Table 2.

EXAMPLE 29

Into a 100-ml rotary evaporator flask are introduced
5 g of L-aspartic acid from Chemie Linz (equivalent to $3.76 \times 10^{-2}$ mol)
5 g of aspartic acid hydrochloride (equivalent to $3 \times 10^{-2}$ mol)
followed, after mixing of the powders, by 50 ml of decalin The reactants are heated to 200° C. (temperature of the oil bath) at atmospheric pressure according to the following temperature profile:
temperature rise from 25° C. to 200° C. over 10 min
temperature maintained for 4 hours at 200° C.

The suspension obtained is filtered; the product is rinsed with decalin and washed with the aid of 2×50 ml of ether. A light yellow powder is obtained which is dried in a heated desiccator.

7.2 g of PSI are recovered (equivalent to a yield of 100%).

The product has a viscosity index equal to 7.35 ml/g and a HUNTER coloration n=90.4
a=−1.6
b=16.4

EXAMPLE 30

Into a 2-liter reactor with an anchor stirrer are introduced
500 g of L-aspartic acid
55.5 g of $KHSO_4$ The polycondensation operation is carried out at atmospheric pressure for 7 hours at a bath temperature of 200° C.

The product obtained is washed with 6×6 liters of water and then dried under vacuum (44 h at 6000 Pa at 70° C.).

310 g of PSI are recovered, which corresponds to a yield of 85%.

The product has a viscosity index VI=10.89 ml/g and a HUNTER coloration

L=92.1
a=1.0
b=8.8

This polysuccinimide is hydrolysed as indicated above; the biodegradability of the hydrolysate is the following:

MRB: 90%
t 10–90: 7 days

EXAMPLE 31

Into a 250-ml rotary evaporator flask are introduced
50.0 g of L-aspartic acid
5.94 g of $NaHSO_4.H_2O$ The polycondensation operation is carried out at atmospheric pressure for 5 h at a bath temperature of 200° C.

The product obtained is washed with 2×4 liters of water and then dried under vacuum (16 h at 6000 Pa at 90° C.).

27.4 g of PSI are recovered, which corresponds to a yield of 75%.

The product has a viscosity index VI=9.78 ml/g and a HUNTER coloration

L=93.1
a=1.0
b=7.4

This polysuccimide is hydrolysed as indicated above; the biodegradability of the hydrolysate is the following:

MRB: 85%
t 10–90 : 5 days

EXAMPLE 32

Into a 250-ml rotary evaporator flask are introduced
50.0 g of L-aspartic acid
5.56 g of $KHSO_4$ The polycondensation operation is carried out under vacuum (6000 Pa) for 5 h at a bath temperature of 200° C.

The product obtained is washed with 3×2 l of water and then dried under vacuum (24 h at 6000 Pa at 90° C.).

25.1 g of PSI are recovered, which corresponds to a yield of 69%.

The product has a viscosity index VI=11.40 ml/g and a HUNTER coloration

L=89.8
a=1.3
b=10.9

EXAMPLE 33

Into a 250-ml round-bottomed flask fitted with a paddle mixer are introduced 33.3 g of L-aspartic acid (Chemie Linz).

Heating is carried out at 190° C. with stirring, with introduction of gaseous HCl at a flow rate of 25 liters/h; the introduction lasts 15 min.

Period of heating (including that for the introduction of HCl):

2 h at 190° C.
followed by 2 h 30 at 200° C.

The powder obtained is ground in a mortar and then washed with water and dried.

The yield of PSI is 100%.

The product has a viscosity index equal to 7.79 ml/g.

This polysuccinimide is hydrolysed as indicated above; the biodegradability of the hydrolysate is the following:

MRB: 97% t 10–90: 4 days

EXAMPLES 34–36

The operation described in Examples 19–28 is repeated, using 5 g of aspartic acid (Chemie Linz)
10 mol % of 95% $H_2SO_4$ at various temperatures (Table 3), with maintenance of the temperature for 4 h.

The product is washed with the aid of 1 liter of water and dried under vacuum.

EXAMPLE 37

Into an unsealed SCHOTT® tube (screw reactor) are introduced 5 g of L-aspartic acid (Chemie Linz)
$2.26 \times 10^{-3}$ mol of $NaHSO_4.H_2O$
0.5 g of ortho-cresol.

The reactants are heated to 200° C. according to the following temperature profile:
temperature rise from 25° C. to 200° C. over 20 min
temperature maintained for 4 h at 200° C.

The product is poured into i liter of water, filtered off and then dried under vacuum in a desiccator at 40° C.

The PSI yield is 82%.

The product has a viscosity index equal to 9.51ml/g.

This polysuccinimide is hydrolysed as indicated above; the biodegradability of the hydrolysate is the following:

MRB: 87% t 10–90: 7 days

EXAMPLE 38

Into a 250-ml rotary evaporator flask are introduced
26.7 g of L-aspartic acid (Chemie Linz)
2.96 g of $KHSO_4$.

The flask is immersed for 6 h in a bath preheated to 180° C.

After washing and drying, a PSI is recovered with a yield of 63.5%.

The product has a viscosity index VI=11.35 ml/g and a HUNTER coloration

L=92.3 a=0 b=8.3

This polysuccinimide is hydrolysed as indicated above; the biodegradability of the hydrolysate is the following:

MRB: 97% t 10–90 : 8 days

EXAMPLES 39–41

A mixture is prepared obtained by incorporating 10 parts by weight of a $H_2SO_4/K_2SO_4$ mixture according to a ratio given in Table 4 in 90 parts by weight of L-aspartic acid then homogenizing the medium by forming a paste using 150 parts by weight of water and evaporating the water (40° C., 6000 Pa.) until the water has been completely removed and grinding.

Approximately 53 g of the powder obtained are introduced into a 250-ml rotary evaporator flask preheated to 200° C.

After polycondensating for 6 h at 200° C., a PSI is recovered without washing with water, whose characteristics appear in Table 4.

EXAMPLE 42

A pulverulent medium is prepared by
forming a paste from
50 g of aspartic acid
2.6 g of $KHSO_4$
using 80 g of water, on an enamelled plate
evaporating the water at 80° C. under vacuum (6000 Pa.)
and grinding using a grinder equipped with blades.

50.6 g of powder are introduced into a 250-ml rotary evaporator flask.

The polycondensation operation is carried out at atmospheric pressure for 6 hours at a bath temperature of 200° C. The medium remains pulverulent throughout the whole of the polycondensation operation.

42.3 g of product are recovered, which corresponds to a PSI yield of 63%.

The product has a viscosity index VI=11.3 ml/g and a HUNTER coloration

L=90.4 a=–2.2 b=9.8

EXAMPLE 43

A pulverulent medium is prepared by
forming a paste from
300 g of aspartic acid
33 g of $KHSO_4$
using 240 g of water, on an enamelled plate
evaporating the water at 80° C. under vacuum (6000 Pa.)
and grinding using a grinder equipped with blades.

247.6 g of powder are introduced into a 1-liter rotary evaporator flask.

The polycondensation operation is carried out at atmospheric pressure for 6 hours at a bath temperature of 200° C. The medium remains pulverulent throughout the whole of the polycondensation operation.

The product obtained is washed with 3×6 liters of water and then dried under vacuum (5 h at 6000 Pa and 100° C.).

130.1 g of PSI are recovered, which corresponds to a yield of 80%.

The product has a viscosity index VI=12.0 ml/g and a HUNTER coloration.

L=94.2 a=–0.3 b=6.5

EXAMPLE 44

A mixture of
300 g of aspartic acid powder
and 33 g of $KHSO_4$ powder
is subjected to a micronizing operation (cryogenic grinder) until a particle size of less than 5 μm is obtained.

251.7 g of powder are introduced into a 1-liter rotary evaporator flask.

The polycondensation operation is carried out at atmospheric pressure for 6 hours at a bath temperature of 200° C. The medium remains pulverulent throughout the whole of the polycondensation operation.

The product obtained is washed with 3×6 liters of water and then dried under vacuum (5 h at 600 Pa and 100° C.).

143.8 g of PSI are recovered, which corresponds to a yield of 87%.

The product has a viscosity index VI=11.1 ml/g and a HUNTER coloration.

L=95.7
a=−0.6
b=4.2

This polysuccinimide is hydrolysed as indicated above; the biodegradability of the hydrolysate is the following:
MRB: 95%
t 10–90: 7 days

EXAMPLE 45

In 10 liters of water are dissolved at 90° C.
270 g of aspartic acid
and 30 g of $KHSO_4$.

The solution obtained is atomized using an ANHYDRO® spray dryer (marketed by ANHYDRO).

50.0 g of powder are introduced into a 250-ml rotary evaporator flask.

The polycondensation operation is carried out at atmospheric pressure for 6 hours at a bath temperature of 200° C. The medium remains pulverulent throughout the whole of the polycondensation operation.

38.6 g of product are recovered, which corresponds to a PSI yield of 94%.

The product has a viscosity index VI=9.5 ml/g and a HUNTER coloration.

L=88.6
a=−2.0
b=10.4

EXAMPLE 46

Formulation of a laundry detergent composition using polysuccinimide obtained in Example 30

By dry-mixing of the various additives the following solid detergent composition is obtained:

| Composition of the washing product | % by weight |
|---|---|
| Linear alkylbenzenesulphonate | 7.5 |
| CEMULSOL LA 90 ® (polyoxyethylenated lauric acid marketed by RHONE-POULENC) | 4 |
| 4 A Zeolite | 24 |
| Sodium silicate ($SiO_2/Na_2O$ = 2) | 1.5 |
| Sodium carbonate | 10 |
| TAED | 2 |
| Sodium perborate | 15 |
| Ethylenediaminetetraacetic acid | 0.1 |
| PSI of Example 30 | 3 |
| Tiponal DMSX ® | 0.1 |
| Tiponal SOP ® (optical brighteners marketed by CIBA-GEIGY) | 0.1 |
| Siliconated anti-foam | 0.2 |
| Alkalase | 0.15 |
| Savinase (enzymes) | 0.15 |
| Sodium sulphate | qs 100% |

"Control washing product" will refer to a washing product of the above composition but containing no PSI.

EXAMPLE 47

The performance of a washing product containing the PSI synthesized in Example 30 was tested for inorganic anti-encrustation.

This effect was measured after 20 washes carried out in the presence of the following test cloths:
Testfabric 405 (4) cotton textiles
Krefeld 12A (8) cotton Inorganic encrustation is calculated from the ash content (in % relative to the total weight of the cotton) of cloths which are washed, dried and burned at 950° C. for 3 hours. The encrustation inhibitory effect is assessed by the ash content with additives/ash content without additives ratio featured under the letter T. The results are the following.

| T % on | T % on |
|---|---|
| Testfabric 405 | Krefeld 12A |
| 28 | 58 |

EXAMPLE 48

This example demonstrates the calcium ion sequestering capacity of the PSI of Example 30 after in situ hydrolysis.

The calcium ion sequestering capacity is measured with the aid of an electrode having a selective membrane which is permeable to calcium ions.

A calibration curve is first plotted using 100 ml of an NaCl solution at a concentration of 3 g/l of pH 10.5 to which quantities of calcium ions varying from $10^{-5}$ to $3\times10^{-3}$ mol/l are added and the potential curve delivered by the electrode is plotted as a function of the free $Ca^{2+}$ ion concentration.

The PSI is hydrolysed using concentrated sodium hydroxide solution until a sodium polyaspartate solution at a concentration of 20% by weight and of pH=10.5 is obtained. The solution obtained is called the "hydrolysate".

This solution is diluted until 100 g of aqueous polyaspartate solution of concentration equivalent to 10 g/l of PSI are obtained; the pH is adjusted to 10.5 using concentrated sodium hydroxide solution. 0.3 g of NaCl powder is added.

The straight line free $[Ca^{2+}]$/bound $[Ca^{2+}]$=f(free$[Ca^{2+}]$) is plotted.

From this straight line are determined:
the complexation constant K of the calcium ions of the polymer
the number So of complexation sites of the polymer, defined by $$\frac{\text{free }[Ca^{2+}]}{\text{bound }[Ca^{2+}]} = \frac{1}{KSo} + \frac{1}{So} \text{ free }[Ca^{2+}]$$

According to this evaluation method the polyaspartate obtained by hydrolysis of the PSI of Example 30 has the following characteristics:

| So (sites/g or polymer) | Log K |
|---|---|
| $3.6 \times 10^{-3}$ | 3.4 |

EXAMPLE 49

This example demonstrates the capacity of the PSI of Example 30 to disperse calcium carbonate after in situ hydrolysis.

In a 100 $cm^3$ test tube (height 26 cm; diameter 3 cm), 2 g of precipitated calcium carbonate are dispersed in 100 ml of an aqueous solution of pH 10.5 (NaOH) containing 3 g/l of NaCl, $3 \times 10^{-3}$ mol/l of $CaCl_2$ and the hydrolysate as prepared in the preceding example, at various concentrations.

The level of the sediment is measured in $cm^3$ at the end of 10 min and the curve of the level of sediment is plotted as a function of the concentration in ppm of the polymer (expressed as dry material).

The curve in FIG. 1 first of all shows a flocculation phenomenon (too low a degree of covering of the polymer particles) followed by restabilization.

This capacity to stabilize inorganic particles is particularly advantageous since it is known that the latter are the cause of encrustration phenomena due to the deposits which accumulate on the cotton.

TABLE 1

| Ex | Caltalyst | YR (%) | VI (ml/g) | Colour L | a | b | MRB (%) | Biodegradbility t 10-90 (d) |
|---|---|---|---|---|---|---|---|---|
| 3 | $H_3PO_3$ | 99 | 19.04 | 88.8 | −1.9 | 11.2 | 88 | 12 |
| 4 | $NaHSO_4.H_2O$ | 89.5 | 9.79 | | | | | |
| 5 | $CH_3SO_3H$ | 85 | 13.92 | 82.1 | 1.3 | 15.8 | | |
| 6 | 95% $H_2SO_4$ | 88 | 10.36 | 55.8 | 2.7 | 8.2 | 93 | 8 |
| 7 | PTSA | 91 | 13.03 | 73.2 | 2.7 | 13.8 | 90 | 26 |
| 8 | $KHSO_4$ | 80 | 9.98 | 88.1 | 2.1 | 11.7 | 90 | 28 |
| 9 | $NaH_2PO_4$ | 61 | 8.64 | 89.8 | 2.4 | 10.2 | | |
| 10 | salicylic acid | 100 | 8.08 | 84.0 | 2.2 | 12.2 | 81 | 15 |
| 11 | $AlCl_3$ | 95 | 7.68 | 88.8 | −0.4 | 15.2 | | |
| 12 | $ZnCl_2$ | 71 | 8.48 | 88.2 | 1.3 | 13.2 | | |
| 13 | $AA/H_2SO_4$* | 99.9 | 9.71 | 81.0 | 2.2 | 14.7 | | |
| 14 | AA/PTSA* | 82.3 | 10.49 | 83.1 | 2.3 | 13.5 | | |
| 15 | $AA/CH_3SO_3H$* | 86 | 10.3 | 88.4 | 1.3 | 13.1 | | |
| 16 | sulphobenzoic acid | 85.4 | 9.02 | | | | 87 | 7 |
| 17 | cyanuric chloride | 93 | 8.88 | | | | 90 | 7 |
| 18 | ethylphosphonic acid | 100 | 10.97 | | | | 92 | 7 |

*Aspartic acid salts
YR: yield of PSI recovered

TABLE 2

| Ex | AA (g) | Catalyst nature | g | Duration (h) | YR (%) | VI (ml/g) | Colour L | a | b | MRB (%) | Biodegradability t 10-90 (d) |
|---|---|---|---|---|---|---|---|---|---|---|---|
| 19 | 5 | 95% $H_2SO_4$ | 0.058 | 4 | 71 | 9.14 | 84.6 | 3.0 | 12.3 | 83 | 7 |
| 20 | 5 | 95% $H_2SO_4$ | 0.116 | 4 | 85 | 9.76 | 87.8 | 2.6 | 11.0 | | |
| 21 | 5 | 95% $H_2SO_4$ | 0.387 | 1 | 65 | 7.90 | | | | | |
| 22 | 5 | 95% $H_2SO_4$ | 0.387 | 2 | 90 | 7.97 | | | | | |
| 23 | 5 | 95% $H_2SO_4$ | 0.387 | 3 | 92 | 8.76 | 66.7 | 3.1 | 12.2 | | |
| 24 | 5 | 95% $H_2SO_4$ | 0.387 | 4 | 94 | 9.04 | | | | | |
| 25 | 5 | 95% $H_2SO_4$ | 0.387 | 5 | 97 | 9.13 | | | | | |
| 26 | 5 | 95% $H_2SO_4$ | 0.387 | 8 | 98 | 9.45 | 61.3 | 4.1 | 13.1 | | |
| 27 | 5 | $NaHSO_4.H_2O$ | 0.155 | 4 | 68.2 | 8.73 | | | | 80 | 11 |
| 28 | 5 | $NaHSO_4.H_2O$ | 0.311 | 4 | 76.4 | 9.40 | 87.9 | 1.8 | 11.4 | | |

TABLE 3

| Ex | T °C. | YR (%) | VI (ml/g) | Colour L | a | b |
|---|---|---|---|---|---|---|
| 34 | 165 | 64 | 7.22 | 92.0 | −0.2 | 6.6 |
| 35 | 165 | 81 | 8.27 | 78.4 | 2.0 | 11.6 |
| 36 | 220 | 95 | 9.77 | 68.4 | 3.8 | 15.2 |

TABLE 4

| Ex | $H_2SO_4/K_2SO_4$ (molar) | Medium (g) | Development of the medium | YR (%) | VI (ml/g) | Colour L | a | b |
|---|---|---|---|---|---|---|---|---|
| 39 | 1 | 53.2 | powder | 86 | 11.40 | 91.9 | 0.6 | 9.3 |
| 40 | 3 | 53.2 | friable medium | 93 | 9.48 | 90.1 | −0.3 | 10.9 |
| 41 | 2 | 53.4 | friable medium | 90 | 11.00 | 91.1 | −0.2 | 9.5 |

We claim:

1. A process for the preparation of polyimides or their polypeptide hydrolysates which are at least 80% biodegradable, by thermal polycondensation of at least one amino acid, optionally followed by hydrolysis, the process comprising carrying out the thermal polycondensation step in the presence of at least one "acid catalyst" selected from the group consisting of
    a) sulfuric, nitric, phosphorus, sulfurous, hydrofluoric, silicic and sulphonic acids, organic sulphonic acids, containing less than 50 carbon atoms, amino acids bearing a non-carboxyl strong acid function, organic phosphonic acids, organic carboxylic acids having a $pK_a$ lower than or equal to 5;
    b) precursors of these acids;
    c) salts of the acids of step a) with an amino acid which is similar to or different from that or those used;
    d) salts of the acids of step a) with a polyimide derived from the polycondensation of at least one amino acid which is similar to or different from that or those used;
    e) hydrochloric acid and its precursors f) hydrochloric acid salts of an amino acid which is similar to or different from that or those used, when the amino acid to be polycondensed is other than glutamic acid;
g) hydrochloric acid salts of a polyimide derived from the polycondensation of at least one amino acid which is similar to or different from that or those used;
h) acid salts of sulfuric, phosphoric or phosphorous acids or their precursors;
i) phosphoric acid precursors other than phosphoric anhydride or polyphosphoric acids; and
j) Lewis acids;

according to an "acid catalyst"/amino acid molar ratio of at least 0.001; said thermal polycondensation operation being carried out in bulk, with a reaction medium remaining in the pulverulent or friable form throughout the whole of the polycondensation operation, in which reaction medium the "acid catalyst" is distributed homogeneously.

2. A process according to claim 1, wherein the "acid catalyst" is
  a) methanesulphonic, benzenesulphonic, trifluoromethanesulphonic, dodecylbenzenesulphonic, para-toulenesulphonic or cysteic acid;
  b) anhydrous or hydrated sulfuric acid, oleum, acid sulfates of potassium, lithium, sodium or quaternary ammonium, $SO_3$;
  c) ammonium sulfate;
  d) neutral alkali metal sulfate/sulfuric acid or neutral alkali metal or alkaline-earth metal sulfate/phosphoric or pyrophosphoric acid mixtures, according to an acid/neutral salt molar ratio of the order of 0.5/1 to 10/1;
  e) hydrogen phosphate of potassium, sodium, lithium or quaternary ammonium;
  f) HCl, $PCl_3$, $PCl_5$, $POCl_3$, cyanuric chloride;
  g) $SiCl_4$, $CH_3SiCl_3$;
  h) salicylic acid, chloroacetic acids, and the like;
  i) phosphomethylglycine, ethylphosphonic acid;
  j) aspartic acid hydrochloride, salts of aspartic acid with sulfuric, methanesulphonic and para-toulenesulphonic acids;
  k) polyanhydroaspartic acid hydrochloride; and
  l) $AlCl_3$, $BF_3$, $ZnCl_2$.

3. A process according to claim 1, wherein the amino acid used is aspartic acid or glutamic acid taken alone or mixed together or with another amino acid.

4. A process according to claim 1, wherein the thermal polycondensation operation is carried out at a temperature of the order of 100° to 250° C.

5. A process according to claim 1, wherein the thermal polycondensation operation is carried out in bulk or in a solvent medium.

6. A process according to claim 1, wherein an acid salt of an amino acid salt is used as sole constituent of the reaction in place of an amino acid/"acid catalyst" mixture.

7. A process according to claim 1 further characterized in that the "acid catalyst" is distributed homogeneously in the reaction medium by a step selected from the group consisting of
  a) forming a paste of a mixture of amino acid and of solid or liquid "acid catalyst" with water or other volatile liquid diluent by evaporation under vacuum or at atmospheric pressure and then grinding the mass obtained;
  b) dissolving the amino acid and solid or liquid "acid catalyst" in water or other dissolver of the amino acid and of the catalyst and then atomizing the solution;
  c) atomizing a suspension of amino acid in a solution of solid or liquid "acid catalyst" in water or other dissolver of the catalyst;
  d) evaporating a solution of solid or liquid "acid catalyst" in water or other dissolver of the catalyst on a fluidized bed of amino acid; and
  e) cogrinding or micronizing a mixture of amino acid and solid "acid catalyst".

8. A process according to claim 1 wherein the "acid catalyst"/amino acid molar ratio is of the order of 0.001 to 0.15, when the "acid catalyst" consists of an acid salt or of an acid salt precursor, and of the order of 0.001 to 0.05, when the "acid catalyst" is other than an acid salt or an acid salt precursor.

9. A process according to claim 1, wherein the polyimide obtained by thermal condensation is hydrolyzed to a polypeptidic salt by addition of a basic agent, the said salt optionally being subsequently neutralized to a polypeptidic acid by addition of an inorganic or organic acid.

10. An aqueous detergent solution containing a detergent composition comprising a polyimide which has a charge density $COO^-$ ranging from 0 to $5 \times 10^{-4}$ mol/g of polymer and which is capable of acquiring in the aqueous solution a charge density $COO^-$ at least equal to $10^{-3}$ mol/g of polymer or a polypeptide hydrolysate of the said polyimide, said polyimide or its polypeptide hydrolysate being obtained according to the process which forms the subject of claim 1.

11. An aqueous detergent solution according to claim 10, wherein the polyimide or its polypeptide hydrolysate represents of the order of 0.2 to 80%, of the weight of the said detergent solution.

12. A detergent composition containing the polyimides or their polypeptide hydrolysate obtained according to the process of claim 1.

13. A process according to claim 1, wherein said organic sulphonic acids contain less than 25 carbons.

14. A process according to claim 1, wherein said organic carboxylic acid of step a) has a $pK_a$ lower than or equal to 3.

15. A process according to claim 1, wherein the "acid catalyst"/amino acid molar ratio is of the order of 0.005 to 10.

16. A process according to claim 1, wherein the "acid catalyst"/amino acid molar ration is of the order of 0.01 to 5.

17. A process according to claim 2, wherein the acid neutral salt molar ratio is of the order of 1/1 to 3/1.

18. A process according to claim 8, wherein said "acid catalyst"/amino acid molar ration is of the order of 0.005 to 0.15 when the "acid catalyst" consists of an acid salt or of an acid salt precursor.

19. A process according to claim 8, wherein said "acid catalyst"/amino acid molar ratio is of the order of 0.005 to 0.05 when the "acid catalyst" is other than an acid salt or an acid salt precursor.

20. An aqueous detergent solution according to claim 11 wherein the polyimide or its polypeptide hydrolysate represents of the order of 2 to 50%.

* * * * *